United States Patent Office 2,782,191
Patented Feb. 19, 1957

2,782,191

NITROGEN CONTAINING CARBINOLS

Walter Reppe and Heinrich Pasedach, Ludwigshafen (Rhine), Erich Dreher, Ludwigshafen (Rhine)-Oppau, and August Amann, Ludwigshafen (Rhine), Germany, assignors to Badische Anilin- & Soda-Fabrik Aktiengesellschaft, Ludwigshafen (Rhine), Germany No Drawing. Application March 22, 1954,
Serial No. 417,941

Claims priority, application Germany March 24, 1953

5 Claims. (Cl. 260—239)

This invention relates to new valuable nitrogen containing carbinols and to an improved process for producing them.

We have found that new valuable nitrogen containing carbinols are obtained by reacting cyclohexylphenyl ketone (I) with amino derivatives of the general Formula II and, if desired, partially or completely hydrogenating the resultant products of the general Formula III at the acetylene linkage by known methods and neutralizing the basic carbinols so obtained with hydrohalogenic acid or methyl halides.

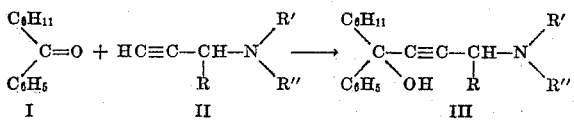

In the Formulae II and III R may be hydrogen or an alkyl group, in particular the methyl group, and R' and R" may be hydrogen or identical or different alkyl or cycloalkyl groups, such as methyl, ethyl, cyclohexyl or butyl groups; R' and R" may also be members of a common five or six membered ring.

Suitable initial materials of the Formula II are for example the aminopropines obtainable from acetylene and alpha-hydroxy-alkylamines according to German patent specification No. 724,759; these include in particular propines substituted by a secondary fully saturated dialkyl amino group or a polymethylene imino group. Preferably these groups contain between 2 and 6 atoms. Representative compounds are 3-dimethylaminopropine, 3-methyl ethyl amino and 3-diethylaminopropine, 3-piperidinopropine, 3-pyrrolidinopropine and 3-morpholinopropine. The 2-aminobutines-(3), such as 2-dimethylaminobutine-(3), 2-cyclohexylaminobutine-(3) or 2-pyrrolidinobutine-(3), obtainable according to German patent specification No. 730,850 are also suitable.

The reaction of said amino derivatives of Formula II with cyclohexylphenyl ketone I takes place at atmospheric, increased or reduced pressure preferably in the presence of the conventional ethinylation catalysts. Among such there may be mentioned for example alkali metal hydroxides, alcoholates and amides, organic bases, such as piperidine or diethylamine, hydroxides of heavy metals of the first group of the periodic system, such as copper, silver or mercury hydroxides, and the corresponding acetylides. Mixtures of these catalysts can also be used. It is preferable to add solvents or diluents, such as ether, tetrahydrofurane, dioxane or alcohols. Generally speaking the reaction takes place sufficiently rapidly at room temperature; sometimes heating or cooling is necessary.

The partial hydrogenation of the products of the general Formula III first obtained to a butylene derivative can be carried out for example with hydrogen under a pressure of 200 atmospheres at 100° C. in the presence of Raney iron; when Raney nickel is used as the catalyst, complete hydrogenation to the corresponding butane derivative takes place already at 80° C. at the same hydrogen pressure.

The new basic carbinols thus accessible in a convenient manner and in good yields and their hydrohalides and methohalides are valuable spasmolytics having an action similar to atropine, especially in the form of their salts, as for example the hydrochlorides or their quaternary ammonium derivatives. They have proved especially active against Parkinson's disease.

It is already known that 1-cyclohexyl-1-phenyl-1-propanols substituted in the 3-position by pyrrolidine or piperidine groups and their salts exhibit such action. They could only be prepared hitherto, however, by troublesome methods from considerably more expensive initial materials. It was on the other hand also known that spasmolytically active basic carbinols are obtained by reacting 2-dialkylaminobutines-(3) with benzophenone and hydrogenating the resulting products at the acetylene group. The above described reaction products from cyclohexylphenyl ketone are superior in their activity to the said known products from benzophenone.

The following examples will further illustrate this invention but the invention is not restricted to these examples. The parts are parts by weight.

Example 1

60 parts of 3-piperidinopropine are added to a suspension of 45 parts of powdered potassium hydroxide and 25 parts of dry sodium methylate in 250 parts of tetrahydrofurane. The mixture is stirred for half an hour at room temperature and then a solution of 47 parts of cyclohexylphenyl ketone in 50 parts of tetrahydrofurane is allowed to flow in gradually. The whole is stirred first for 2 hours at 40° C. and then for a further 8 hours at room temperature. 100 parts of water are then added and the aqueous alkaline layer is separated off. The organic layer is stirred with about 10% hydrochloric acid until the aqueous layer has an acid reaction to Congo, the hydrochloride of 4-piperidino-1-cyclohexyl-1-phenyl-1-hydroxybutine-(2) thus being precipitated. The free base obtainable therefrom with caustic alkali solution has the melting point 165° C. after recrystallisation from ether.

12 parts of this base are dissolved in tetrahydrofurane and hydrogenated at 80° C. with 200 atmospheres of hydrogen with the addition of Raney nickel as catalyst. The oily 4-piperidino-1-cyclohexyl-1-phenyl-butanol-(1) thus formed in a practically quantitative yield forms, by stirring with hydrochloric acid, a hydrochloride which melts at 248° C. after recrystallisation from a mixture of ethanol and ether.

Example 2

To 10 parts of sodium wire covered with about 250 parts of dry ether, 20 parts of 3-pyrrolidinopropine are added. A solution of 22 parts of cyclohexylphenylketone in 50 parts of ether are run into the mixture and the whole is heated to boiling for 5 hours. 100 parts of water are added, and the aqueous-alkaline layer is separated. The ethereal layer is first washed with water and then extracted with dilute hydrochloric acid, the basic constituents of the reaction mixture being taken up by the acid. After evaporation of the ether the unreacted cyclohexyl-phenyl-ketone can be recovered by distillation.

The aqueous hydrochloric acid solution is covered with ether and made alkaline by the addition of potassium carbonate, the bases liberated being taken up by the ether. The dried ethereal solution is evaporated and the unreacted 3-pyrrolidinopropine is distilled off. By recrystallizing the bottoms from cyclohexane there are obtained 15 parts of 4-pyrrolidino-1-cyclohexyl-1-phenyl- 1-hydroxy-butine-(2) having a melting point of 128°–129° C.

*Example 3*

To a solution of 150 parts of 3-hexamethyleneiminopropine in 500 parts of dry ether 35 parts of metallic sodium are added. The mixture is heated to boiling and a solution of 188 parts of cyclohexylphenylketone in 500 parts of ether is run in at a rate that the reaction mixture is set boiling. The mixture is kept boiling for about 1 hour, then allowed to cool and, after adding water, the aqueous-alkaline layer is separated off. The ether layer is dried. The bottoms left after distilling off the ether are recrystallized from methanol giving 128 parts of colorless cube-shaped crystals which consist of 4-hexamethyleneimino-1-cyclohexyl-1-phenyl-1-hydroxybutine-(2) and have a melting point of 121°–122° C.

By dissolving this base in ether and adding an alcoholic solution of hydrogen chloride the hydrochloride which melts at 222° C. (with decomposition) is obtained in a quantitative yield.

*Example 4*

To a suspension of 100 parts of pulverulent potassium hydroxide and 35 parts of pulverulent sodium methylate in 300 parts of dry ether, 56 parts of 3-diethylaminopropine are added while stirring. To this mixture 100 parts of cyclohexyl-phenylketone are added and the whole is stirred for 24 hours at ordinary temperature. Then 300 parts of water are added, the aqueous-alcoholic layer is stripped off and the ethereal layer is processed as in Example 2. By recrystallization from petroleum ether 75 parts of 4-diethylamino-1-cyclohexyl-1-phenyl-1-hydroxybutine-(2) are obtained having a melting point of 86°–87° C.

*Example 5*

To a solution of 15 parts of 4-diethyl-amino-1-cyclohexyl-1-phenyl-1-hydroxybutine-(2), prepared as described in Example 4, in 300 parts of ether 10 parts of methyliodide are added. After several days' standing at ordinary temperature 21 parts of the crystalline methoiodide have separated which, after recrystallization from hot water, has the composition that corresponds to the formula $C_{21}H_{32}ONJ$: Found: C 57.00, H 7.20, O 3.90, N 3.02, J 28.4. Calculated: C 57.10, H. 7.25, O 3.63, N 3.18, J 28.8.

*Example 6*

15 parts of 4-diethylamino-1-cyclohexyl-1-phenyl-1-hydroxybutine-(2) prepared as described in Example 4 are dissolved in 150 parts of methanol and, after adding a barium sulfate/palladium catalyst (palladium content 0.4%), the solution is hydrogenated with hydrogen at ordinary temperature. When 2 atoms of hydrogen have been taken up, the catalyst is filtered off, the methanol is evaporated, the bottoms are dissolved in ether and 15 parts of methyliodide are added. After about 24 hours' standing the methoiodide of the 4-diethylamino-1-cyclohexyl-1-phenyl-1-hydroxylbutene-(2) precipitated is filtered off by suction. The values found after recrystallizing it from hot water correspond to the formula $C_{21}H_{34}ONJ$: Found: C 57.27, H 7.25, O 4.00, N 3.26, J 28.4. Calculated: C 57.01, H 7.67, O 3.62, N 3.16, J 28.65.

*Example 7*

Proceeding as described in Example 6 the hydrogenation is continued until 4 atoms of hydrogen have been taken up. In further processing as in Example 6 the methoiodide of the 4-diethylamino-1-cyclohexyl-1-phenyl-1-hydroxybutane of the composition $C_{21}H_{36}ONJ$ is obtained in an almost quantitative yield.

What we claim is:

1. Members of the group consisting of basic nitrogen containing carbinols, the hydrohalides and the methyl halides thereof wherein the free base form has the general formula:

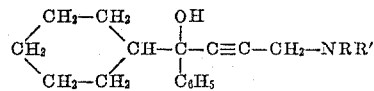

and R and R' are radicals selected from the class consisting of methyl and ethyl and —NRR' is a radical selected from the class consisting of pyrrolidino, piperidino, morpholino and hexamethylene-imino radicals.

2. A member of the group consisting of 4-piperidino-1-cyclohexyl-1-phenyl-1-hydroxy-butine-2 and its hydrohalides and methyl iodide.

3. A member of the group consisting of 4-diethylamino-1-cyclohexyl-1-phenyl-1-hydroxy-butine-2 and its hydro halides and methyl iodide.

4. 4-pyrrolidino-1-cyclohexyl-1-phenyl-1-hydroxybutine-(2).

5. 4-hexamethylene-imino-1-cyclohexyl-1-phenyl-1-hydroxy-butine-(2).

References Cited in the file of this patent

UNITED STATES PATENTS

| 2,584,429 | Croxall | Feb. 5, 1952 |
| 2,662,886 | Ruddy | Dec. 15, 1953 |
| 2,682,543 | Adamson | June 29, 1954 |

FOREIGN PATENTS

| 282,215 | Switzerland | Apr. 15, 1952 |
| 503,775 | Belgium | June 30, 1951 |
| 966,226 | France | Oct. 4, 1950 |

OTHER REFERENCES

Denton et al.: Jour. of the American Chem. Soc., vol. 71, pp. 2050–56, Dec. 10, 1948.